United States Patent
Parnell et al.

(10) Patent No.: US 7,032,238 B2
(45) Date of Patent: Apr. 18, 2006

(54) REAL-TIME AUTOLEVELING SYSTEM

(75) Inventors: James Winton Parnell, Westampton, NJ (US); Christopher Coonan, Fairless Hills, PA (US); Richard L. Booth, Bensalem, PA (US); Whitney Blackmon, Holland, PA (US); Charles Chuanming Wang, Jamison, PA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 976 days.

(21) Appl. No.: 09/908,134

(22) Filed: Jul. 18, 2001

(65) Prior Publication Data

US 2002/0170071 A1 Nov. 14, 2002

Related U.S. Application Data

(60) Provisional application No. 60/219,354, filed on Jul. 19, 2000.

(51) Int. Cl.
*H04N 7/173* (2006.01)
(52) U.S. Cl. .................. 725/107; 725/111; 725/131
(58) Field of Classification Search ............. 725/107, 725/111, 106, 130; 455/450, 451; 348/192; 370/252, 480
See application file for complete search history.

(56) References Cited

U.S. PATENT DOCUMENTS

| | | | |
|---|---|---|---|
| 5,961,603 A | | 10/1999 | Kunkel et al. ............ 709/229 |
| 5,999,970 A | | 12/1999 | Krisbergh et al. ......... 709/217 |
| 6,075,972 A | * | 6/2000 | Laubach et al. .......... 455/3.05 |
| 6,212,399 B1 | * | 4/2001 | Kumar et al. ............. 455/522 |
| 6,453,472 B1 | * | 9/2002 | Leano et al. ............. 725/111 |
| 6,757,908 B1 | * | 6/2004 | Vogel ..................... 725/107 |
| 6,772,437 B1 | * | 8/2004 | Cooper et al. ............ 725/111 |
| 6,782,884 B1 | * | 8/2004 | Chen et al. .............. 725/111 |
| 6,788,950 B1 | * | 9/2004 | Raissinia et al. ......... 455/522 |
| 6,877,166 B1 | * | 4/2005 | Roeck et al. ............. 725/111 |
| 6,895,043 B1 | * | 5/2005 | Naegeli et al. ........... 375/224 |
| 2002/0056132 A1 | * | 5/2002 | Wilson ................... 725/118 |

FOREIGN PATENT DOCUMENTS

WO     WO 9915968 A1 * 4/1999

* cited by examiner

*Primary Examiner*—John Miller
*Assistant Examiner*—Chris Parry
(74) *Attorney, Agent, or Firm*—Patterson & Sheridan, LLP

(57) ABSTRACT

A terminal is coupled to a video distribution network headend, and transmits upstream packets to the headend. Each upstream packet has a transmission power. The terminal receives a downstream packet from the headend, indicating a change in power. The terminal calculates an adjusted transmission power, based on the change in power specified in the downstream packet, and sets the transmission power of the upstream packets to the adjusted transmission power. The headend can be coupled to one or more terminals. The headend receives upstream packets from the terminal. The headend senses a received transmission power of each packet, and calculates a weighted average transmission power based on the received transmission powers. The headend calculates a change in transmission power based on the weighted average and a predetermined set point. The headend transmits a downstream packet to the terminal, indicating the change in power.

30 Claims, 10 Drawing Sheets

DATA PAYLOAD 112

US 7,032,238 B2

REAL-TIME AUTOLEVELING SYSTEM

This application claims the benefit of priority of U.S. Provisional Patent Application No. 60/219,354, filed Jul. 19, 2000.

FIELD OF THE INVENTION

The present invention relates to interactive video equipment generally, and more specifically to television converter equipment and methods and systems for interfacing with and operating the equipment.

DESCRIPTION OF THE RELATED ART

U.S. Pat. Nos. 5,961,603 and 5,999,970 are expressly incorporated by reference herein in their entireties. These patents teach a real-time system and method for accessing Internet-based and other information through a user television converter in a television distribution network. The patents enable a user to access and view information that is related to the programming content of a currently viewed television broadcast. This concept, known as channel hyperlinking, enables a television viewer to download Internet Web pages, and the like.

In any practical network, there is some attenuation of the signals transmitted from the cable converter terminals to the network headend. Because of the attenuation, the power level received at the headend 14 is different from the predetermined set point at which the headend is best able to receive the data. Attempts have been made to compensate for the attenuation using an a calibration process either manually or at a specified interval (e.g., every 30 minutes, 1-hour, 8 hours, 12 hours etc.). The calibration process performs two basic steps. In the first step, the headend instructs the set top converter to send out calibration signals across a range of transmission power levels. The headend measures the level of each signal during the calibration process and then calculates the optimum transmit level for the set top converter. The second step of the process is a response verification step, during which the set top converter sends a verification signal at the calculated optimum level. If this response signal is measured within a desired range, the calibration is recorded as successful, and the corresponding level is set in the converter. If the calibration fails, the converter is flagged as "Non-Responding" and is not calibrated until the next system calibration time.

An improved method of controlling the transmission power of the set top converter is desired.

SUMMARY OF THE INVENTION

One aspect of the invention is a terminal coupled to a network headend of a video distribution system, and a method for operating the terminal. The terminal transmits a plurality of upstream packets to the network headend, each upstream packet having a transmission power. The terminal receives a downstream packet from the network headend, the downstream packet indicating a change in power. The terminal calculates an adjusted transmission power, based on the change in power specified in the downstream packet. The terminal sets the transmission power of the upstream packets to the adjusted transmission power.

Another aspect of the invention is a network headend of a video distribution system. The headend 14 is capable of being coupled to at least one terminal. The headend receives a plurality of upstream packets from the terminal. The headend senses a received transmission power of each packet. The headend calculates a weighted average transmission power based on the received transmission powers. The headend calculates a change in transmission power based on the weighted average and a predetermined set point power. The headend transmits a downstream packet to the terminal, the downstream packet indicating the change in power.

OVERVIEW

Figure 1:
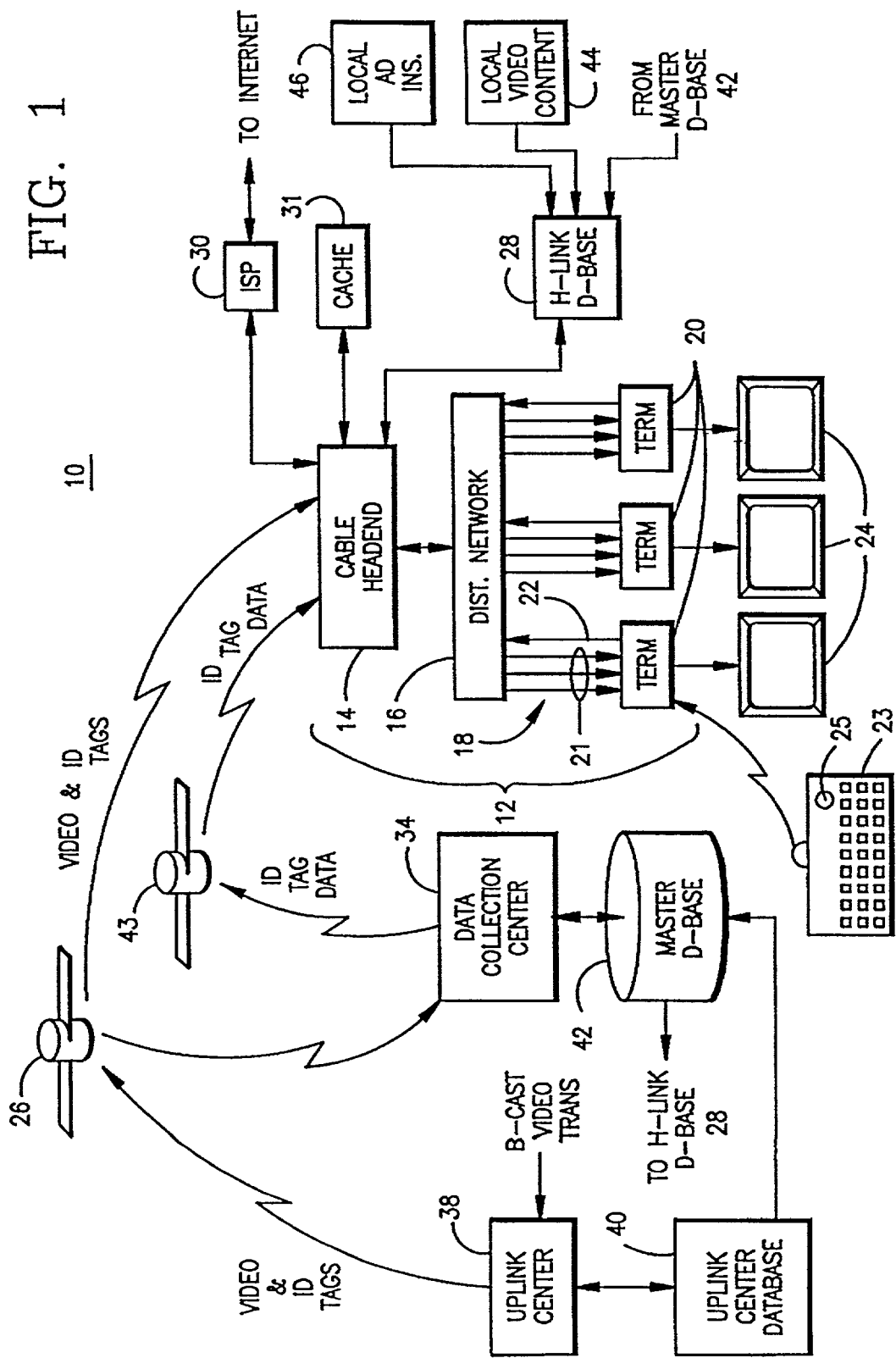
FIG. 1 is a schematic block diagram of a system for linking television distribution system users to Internet based information which is related to the content of a viewed program.

FIG. 1 is a block diagram of an exemplary information communication system 10 in which an auto-leveling system according to the present invention may be used. The system 10 includes a television distribution system 12 for distributing television and other programming to a plurality of system users. The video distribution system 12 has a television on-line communications system (TOCS) headend controller 14, referred to herein as the "headend." The headend 14 is capable of being coupled to at least one terminal 20, which may be a cable set top converter for a television 24.

The terminal 20 transmits a plurality of upstream packets to the network headend, each upstream packet having a transmission power. The TOCS headend 14 is capable of sensing the power level of each packet of data sent by the terminal 20. These packets may be, for example, requests for information related to the program currently being displayed on the television 24, or requests to transmit or receive electronic mail. The system allows real-time dynamic leveling of the amplitude of upstream transmission power for packets sent from the terminal 20 to the headend 14. The set top terminal 20 being leveled has software to interpret and act upon control inputs from the headend 14. Using the capabilities of the terminal to adjust its transmission power level, the exemplary system is capable of adapting to short and long term ingress and changing conditions of the cable plant. Unlike the systems of the prior art, the exemplary terminal 20 determines its own transmission power adjustment based on a desired change in received power determined by the headend 14.

The headend 14 receives the plurality of upstream packets from the terminal 20. The headend 14 senses a received transmission power of each packet. The headend 14 calculates a weighted average transmission power based on the received transmission powers. The headend 14 calculates a change in transmission power based on the weighted average and a predetermined set point power. The headend 14 transmits a downstream packet to the terminal 20, indicating the change in power. The terminal 20 receives the downstream packet from the network headend. The terminal calculates an adjusted transmission power, based on the change in power specified in the downstream packet. The terminal sets the transmission power of the upstream packets to the adjusted transmission power.

The exemplary system provides real-time level control. The advantage of a real-time system is that it adapts to short duration conditions that cannot be handled by a periodic auto-leveling scheme. This includes ingress (induced noise), the addition of new set top converters 20, and changes to customer installations caused by the addition or removal of splitters, or the like.

The exemplary system provides logistical simplification. In large plants, it might take days to level all the set top converters 20 in the system using a technique of the prior art. With the exemplary embodiment of the present invention, no scheduling is required. All leveling is done when the user logs in to the network operated by the TOCS headend 14.

The exemplary system provides insensitivity to sensing variability. The exemplary control algorithm is designed to be relatively insensitive to variability in power level readings. Thus, the algorithm prevents the system from entering an unstable feedback loop. This condition, (which is also known as "level thrash"), would occur if the set top converter's response time lags excessively behind the control inputs of the TOCS headend 14, which would be based upon previous (potentially invalid) level readings. This level thrash condition, if not corrected, leads to wild fluctuations in output levels and ultimately a failure to level. The method of avoiding level thrash is described in greater detail below.

The exemplary system is not hardware specific. The algorithm is insensitive to the type of set top converter 20 being leveled, or the type of upstream receivers being used.

The auto-leveling system is described in greater detail below with reference to FIGS. 8–11, in the section entitled, "SET TOP AUTO-LEVELING SYSTEM." First, a general description is provided for the interactive video distribution system in which the auto-leveling system is used.

DETAILED DESCRIPTION

The Distribution System

Referring again to FIG. 1, the distribution system 12 includes a network headend 14 for supplying programming through a distribution network 16. The distribution network 16 distributes the television programming through a plurality of transmission links 18 to a corresponding plurality of user terminals or set top converter boxes 20. Each of the transmission links 18 preferably includes a plurality of downstream channels 21, and at least one upstream channel 22. Each of the set top converter boxes 20 enables a user to select, via a remote control device 23, for example, one of the downstream channels 21 to be viewed on a television 24. Preferably, the remote control device 23 comprises a computer style keyboard, which communicates with the set top converter box 20 by means of a conventional infra-red wireless link. Additionally, a pointing device, such as a mouse or the like (not shown), may be used in conjunction with the keyboard 23. Alternatively, the remote control device 23 may also comprise a conventional television remote control.

Each of the communication links 18 preferably comprises a coaxial cable; however, it will be understood that other types of links, such as fiber optics and wireless links, for example, may be employed. The distribution network 16 supplies the video programming information for each of the plurality of downstream channels 21 to each of the set top converter boxes 20 by using a conventional digital or analog communication scheme. The communication links 18 are preferably operated in a two-way manner, in which at least one of the upstream channels 22 is provided for each set top converter box 20 to enable it to send information requests to the network headend 14 in real-time. This allows a user to request access to Internet-based or other information related to the currently viewed programming through actuation of a channel hyperlink button 25 on the keyboard 23.

The network headend 14 receives video programming to be distributed to the user from a satellite 26. The headend 14 can also access information from one or more headend databases 28 (hereinafter referred to as the hyperlink database). This information may be used to select the Internet or other information, which can be downloaded to the set top converter boxes 20 for viewing on the user televisions 24. The information stored in the hyperlink database(s) 28 is reference information, which is related in some manner to the programs and advertisements being broadcast through the distribution network 16 to the users. For example, the reference information preferably includes source, content, timing and duration information regarding each program or advertisement. In addition, a key piece of information is typically a Uniform Resource Locator (URL) which is used to reference more detailed information associated with the content of the programs and advertisements being broadcast.

The programming content related information might be in any suitable form, such as text and associated graphics or pictures (e.g., Internet Web pages, full motion video, audio, etc.). Although the content related information may be from any source, it is preferable that at least some of the information be obtained from the Internet. This is preferably accomplished by interfacing the headend 14 to a conventional Internet Service Provider (ISP) 30. Although the headend 14 can access the information directly from the ISP 30 in real-time, it is preferable that the headend 14 access the information from the ISP 30 in advance of any information requests being received from the users. It is also preferable that the headend 14 stores or caches the information in a cache 31 interfaced between the ISP 30 and the headend 14, so that it may be quickly accessed and downloaded to a user in response to an information request.

To facilitate channel hyperlinking by a user from a video program or advertisement to related Internet-based or other information, means are provided for identifying to the network headend 14, the identity of the program which was being viewed at the instant that the user initiated the hyperlinking request. This may be accomplished by having all sources of broadcast programming periodically insert an identification number or tag, hereinafter referred to as an ID tag, into the transmitted television signal approximately once every second. The ID tag identifies the programming content, and may also identify the company or organization originating the program or advertisement, as well as unique demographic or geographic information which identifies known geographic and demographic categories within a given country or market. As is discussed in greater detail below, the headend 14 employs the ID tag to perform a table look up operation in the hyperlink database(s) 28. Headend 14 retrieves the reference information (e.g., URLs), which is used to access the content related information from the ISP 30 and/or the cache 31.

A data collection center 34 is preferably provided which receives, monitors and collects broadcast programming via the satellite 26 from a plurality of broadcast and cable television network uplink centers 38 (only one shown in FIG. 1), each of which is operated by a corresponding broadcast or cable television network. The purpose of the uplink center 38 is not only to broadcast video programming via the satellite 26, but also to insert the ID tags in the video programming. In the case of analog television signals, this can be accomplished by inserting the ID tag in the vertical blanking interval (VBI) of the signal, or by inserting the tag in either the audio or live video stream. For digital communications, such as those based on the MPEG II format, for example, the ID tag data may be periodically (e.g., approximately once every second) inserted in a data stream associated with the particular video and audio data stream.

Each of the uplink centers 38 also preferably communicates with an uplink center database 40 which stores information relating to the programming or advertising content such as the URL or other Web based information to be associated with the programming or advertising content. The URL data in each of the uplink center databases 40 is preferably communicated via the Internet to a master database 42 which is interfaced to the data collection center 34. The master database 42 contains the URL and other reference data for all channel hyperlinks for the various national broadcast and cable TV networks. This information is then retransmitted, again preferably through the Internet, to each of the network headends 14 where the URL data is stored in the one or more hyperlink databases 28. Additionally, although much of the URL data stored in the hyperlink database 28 is the same as the corresponding data stored in the master database 42, there may be some differences. For example, there would be differences if the URLs or other Web data to be associated with an ID tag, as supplied by the programming source, were to be unique for a particular geographic or demographic location or market. An ID tag for an advertised product may be linked to information pertaining to one supplier of the product in a first market area, and information pertaining to a second supplier in a second market area. The data collection center 34 thus manages the transmission of the URL data from the master database 42 to the hyperlink database 28 in accordance with any geographic or demographic identifiers that may be present in each ID tag. Also, the headend database 28 will likely contain only the information on ID tags for programming and advertising which may likely appear on the broadcast channels received by the headend 14, while the master database 42 will contain all such information.

The collection center 34 also combines all of the ID tags which are present in all of the television signals that are received from the satellite 26, and retransmits the ID tags as a combined data stream to a second satellite 43. The second satellite 43 transmits this combined ID tag data stream to each cable headend 14. Although the ID tags are obviously present in the video signals being received by the cable headend 14 from the first satellite 26, the separate transmission of the ID tags eliminates the need for the headend 14 to detect and remove the ID tags from the incoming video signals. Alternatively, however, it will of course be understood that the headend 14 can detect and remove the ID tags itself.

The hyperlink database 28 also preferably receives URL hyperlink data from a local video content source or database 44 which supplies information for national network local affiliates, community access, locals schools, and cable operator sponsored channels, for example. A source 46 of local advertising insertion is also provided for supplying local advertisement ID tags to each hyperlink database 28. The local ad insertion equipment informs the hyperlink database 28 in real-time of any ID tags when it is going to insert advertisements in the broadcast.

Figure 2:
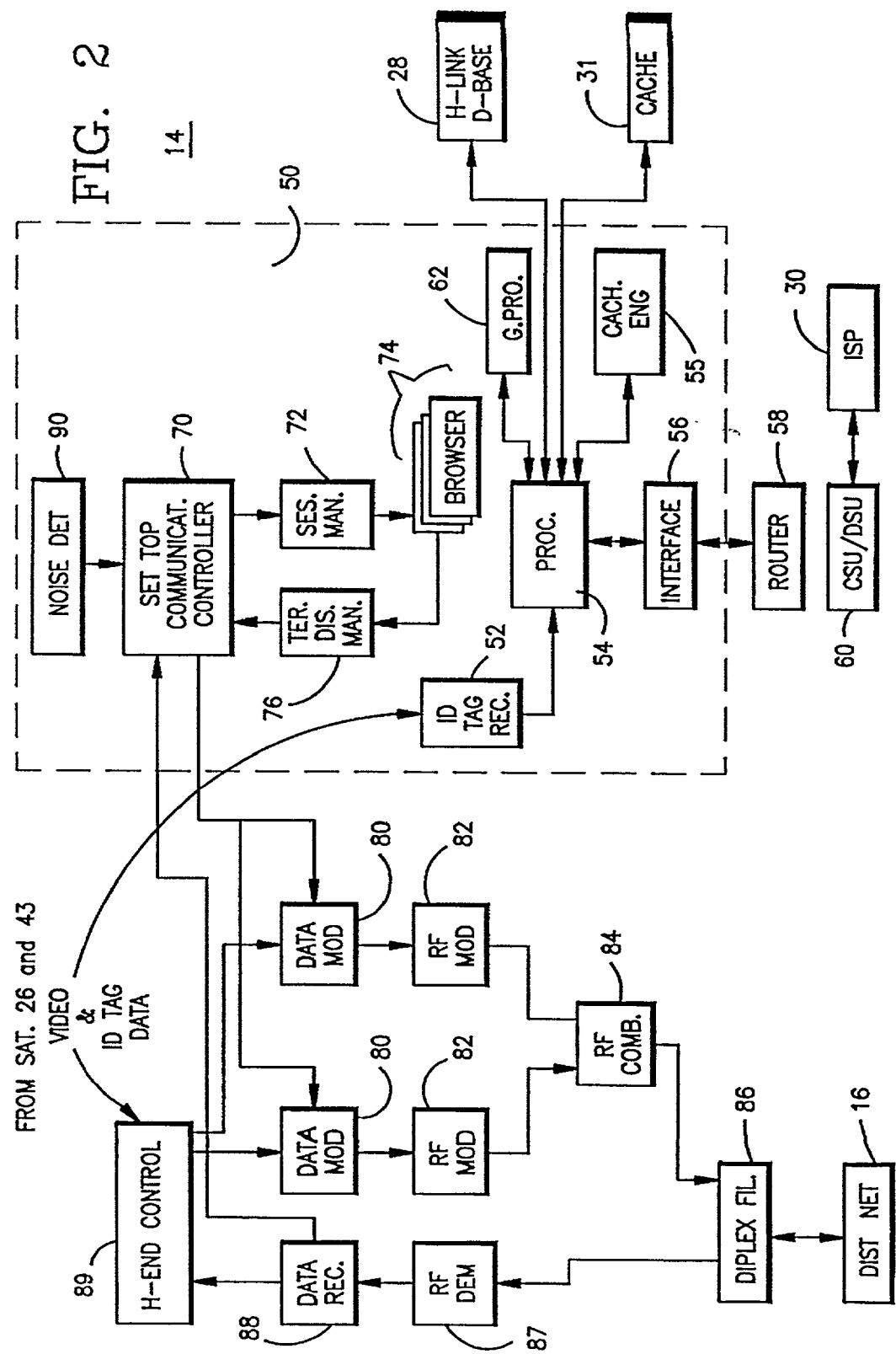
FIG. 2 is a schematic block diagram of a network headend employed in the system of FIG. 1.

FIG. 2 illustrates the details of the headend 14 in the preferred embodiment of the present invention which operates by supplying channel hyperlink and other Internet information to each user through insertion of the information in the downstream television signals. The heart of the headend 14 is a headend server 50. Server 50 manages accessing of channel hyperlink information from the ISP 30, hyperlink database(s) 28 and local database 44, storage of pre-cached channel hyperlink information in the cache 31, and reception of program content ID tag information from an ID tag receiving circuit 52. The headend server 50 includes a processor 54 for carrying out these operations. The processor 54 sends Internet information requests to, and receives requested information from, the ISP 30 by means of a number of conventional communications elements including a caching engine 55, an interface 56, a router 58 and a channel service unit/data service unit (CSU/DSU) 60. The caching engine 55 manages the predictive caching of HTML Web site hyperlink data from the ISP 30, and storage of this data in the cache 31. A conventional graphics processor 62 may also be provided, if necessary, for converting the graphics portion of the HTML data received from the ISP 30 into a graphics format which is compatible with the user television 24.

The channel hyperlink information requests are received from a user by a set top communications controller 70. These requests are forwarded to a session manager 72 which can manage multiple sessions from a plurality of the set top converter boxes 20, and maintains an association between the received request and the one of the converter boxes 20 which made the request. More particularly, each channel hyperlink information request received by the communications controller 70 includes an identification number or code, which identifies the set top converter box 20 that sent the request. The session manager 72 keeps track of this information and will match the Internet information requested with the correct set top converter box 20 which submitted the request.

After a request is received from one of the set top converter boxes 20, the session manager 72 forwards the request to the processor 54, and connects the user to one of a plurality of active browser applications (browsers) 74. By providing a plurality of the browsers 74 which are actively running, but are not currently being used by any users, a user can be connected to the channel hyperlink information without the delays which are normally associated with the opening of a browser application. The session manager 72 monitors the number of available active browsers 74 as users are connected to the channel hyperlink information through the browsers 74, and the number of available active browsers decreases. Once this number reaches a predetermined minimum, e.g., 3, the session manager 72 causes a predetermined number, e.g., 5, of the browsers 74 to be reactivated to insure that an active browser will always be available when channel hyperlink information is requested to be accessed by a user. It should be understood that although the use of plural active browsers in the foregoing manner is preferred, it is not necessary to employ this feature to practice the present invention, and the browsers 74 could be opened in a conventional "as needed" manner if desired.

The channel hyperlink information is accessed by the browser application 74 from either the cache 31 or the ISP 30. The browser application 74 constructs the accessed information (e.g., Web page) into a bitmap which is preferably compressed to reduce transmission time between the headend 14 and the set top converter box 20. The compressed bitmap is then forwarded by the browser application 74 to a terminal display manager 76. Preferably, the terminal display manager 76 is designed to minimize further the actual amount of information that must be transmitted to the set top converter box 20. This is accomplished by transmitting to the set top converter box 20, only the information necessary to refresh portions of a display screen that is to be changed.

The set top communications controller 70 transmits the display information from the display manager 76 to a data modulator 80. In a preferred embodiment, the modulator 80 comprises a VBI data inserter. As the name implies, a VBI data inserter inserts the channel hyperlink related data into the vertical blanking interval of the video program currently being broadcast on the one of the downstream channels 21 on which the hyperlink data is to be downloaded. It should be noted that a plurality of the data modulators 80 is provided, one for each of the available downstream channels 21. Alternatively, this information, along with appropriate identifiers, is included as part of an elementary digital stream of data. Each downstream channel 21 also includes an RF modulator 82 for modulating each television signal to the appropriate channel frequency. An RF combiner 84 is provided which receives the outputs from all of the RF modulators 82 and combines them to form a single signal. This signal is then fed to a diplex filter 86, and finally to the distribution network 16.

The purpose of the diplex filter 86 is to separate upstream channel hyperlink information requests received from the users over the transmission link 18, from the downstream television signals. These upstream requests are fed from the diplex filter 86 to a plurality of RF demodulators 87, one for each upstream channel 22, and then to an upstream data receiver 88 which forwards the requests to the communications controller 70 for processing by the headend server 50. A network headend controller 89 includes equipment for receiving television broadcast transmissions from the second satellite 36, and distributing the transmissions over the respective downstream channels 21.

Preferably, a noise detector 90 is also provided in the communications controller 70 for detecting the noise level on each of the upstream channels 22. If the detected noise level is too high on one of the upstream channels 22, the communications controller 70 can re-assign each of the set top converter boxes 20 to another one of the upstream channels 22. Alternatively, the communications controller 70 can direct the affected ones of the set top converter boxes 20 to transmit at a higher level if necessary. Preferably, the noise detector 90 comprises software that determines noise levels by keeping statistics corresponding to the number of corrupted data packets received on each of the upstream channels 22.

Figure 3:
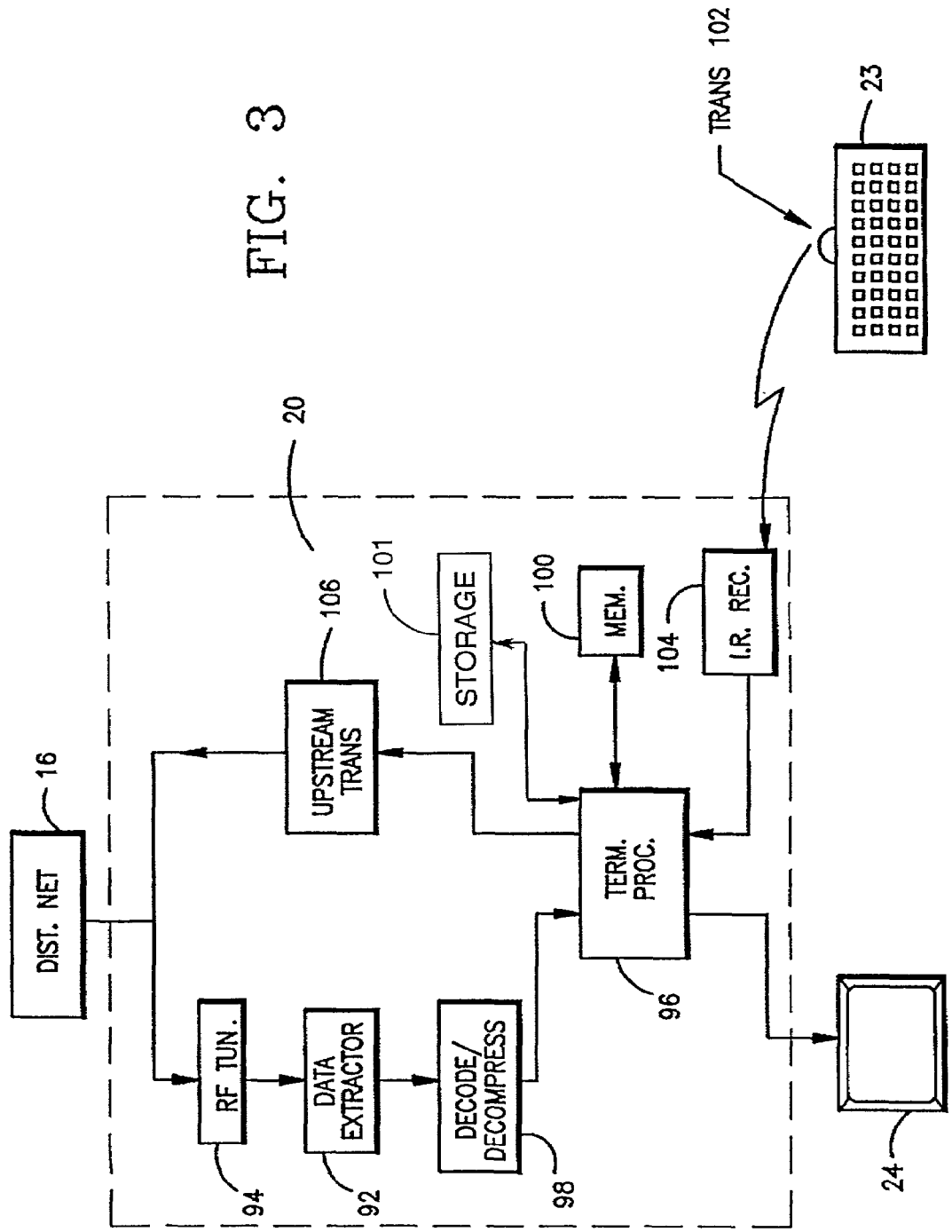
FIG. 3 is a schematic block diagram of a set top converter box circuit employed in the system of FIG. 1.

With reference now to FIG. 3, the circuitry contained in the set top converter box 20 is illustrated. In the preferred embodiment, downstream television signals received from the distribution network 16 are fed to a downstream data extractor 92 via an RF tuner 94. In the embodiment in which the data modulator 80 comprises a VBI inserter, the extractor 92 comprises a VBI extractor. The RF tuner 94 is controlled by the user to select and demodulate one of the downstream channels 21. Additionally, a set top or terminal processor 96 is provided which can also control the RF tuner 94 for selection, in response to information received from the communications controller 70, the one of the downstream channels 21 on which requested hyperlink information will be received. The extractor 92 removes the inserted channel hyperlinking information from the blank intervals of the video signal, and forwards it to the terminal processor 96. Preferably, the processor 96 also includes the software for performing the function of decoding and decompressing the video display data. Preferably, the terminal 20 has a storage device 101, which may be a permanent (hard) disk drive, read-only memory (ROM), electrically erasable read only memory (EEPROM), or other non-volatile storage medium. Storage device 101 also stores computer program code that is used to perform the auto-leveling functions described below with reference to FIGS. 8–10. Alternatively, the set top converter box 20 may include a decoding and/or decompression module 98 interposed between the extractor 92 and the processor 96 for performing this function.

The terminal processor 96 is interfaced to a memory bank or module 100 which facilitates the various processing functions performed by the processor 96, including production of the video display information from the extracted information, and display of the same on the television display screen 24. The terminal processor 96 also receives channel hyperlinking commands from a user via the keyboard 23. The remote control 23 preferably includes an IR transmitter 102, which communicates with an IR receiver 104, contained within the set top converter box 20. It will be of course understood that any other type of input arrangement, such as a hard wired keyboard or mouse, for example, could be employed for entering the channel hyperlink requests. The receiver 104 forwards the channel hyperlinking request to the terminal processor 96, which identifies the channel to which the RF tuner 94 is tuned. This information, along with the set top converter box identification number, is then forwarded by means of an upstream transmitter 106 through the transmission link 18 to the headend 14 for processing.

Although one embodiment of the invention is specifically designed for use with analog video signals in which the channel hyperlink information is inserted into the vertical blanking intervals of the analog video signals, the information could also be inserted into the horizontal blanking intervals and/or the video and audio streams if desired. Such alternative arrangements would be useful, for example, for increasing the transmission rate of the channel hyperlink information. Further, it would be a simple matter to implement the present invention using an all digital format, such as MPEG II, for example. In such an arrangement, the data modulator 90 and extractor 92 would be implemented by a corresponding digital data inserter and extractor which are compatible with the selected digital format.

The transmission of upstream and downstream data between the set top converter box 20 and the communications controller 70 of the headend server 50 is now described with reference to FIGS. 4–7F. Preferably, each upstream channel 22 of the television distribution network 12 is multiplexed into a plurality of upstream slots, where the temporal length T of each slot is equal to the temporal length T of a single picture field in the downstream video signals, where each picture field includes a picture interval and a vertical blanking interval. In the USA broadcasting convention, T equals 1/60th of a second. Also preferably, a plurality of the upstream channels 22 are paired with each downstream channels 21. In the preferred embodiment of the present invention, up to four upstream channels are paired with each downstream channel. Also preferably, each set top converter box 20 in the system 10 is assigned to at least one of the upstream slots at any one time.

Figure 4:
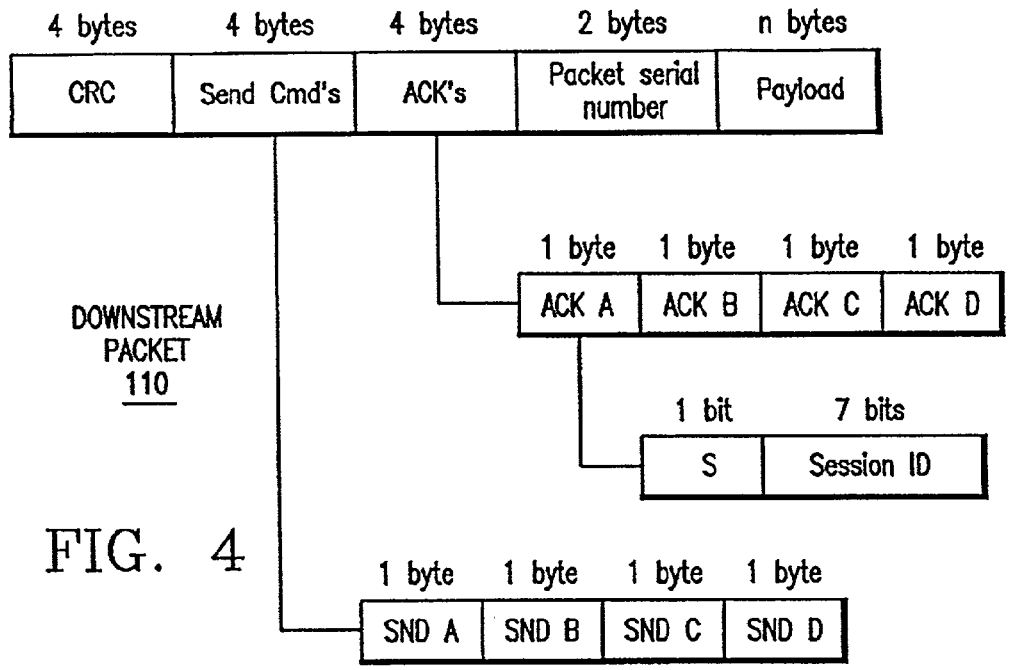
FIG. 4 is a diagram of a downstream packet transmitted on one of the system's downstream channels.

Preferably, and referring now to FIG. 4, each transmission of downstream data from the communications controller 70 of the headend server 50 is in the form of at least one downstream packet 110. As illustrated, the downstream packet 110 includes a four-byte cyclical redundancy check (CRC) value based on the rest of the downstream packet 110, where the CRC value is employed to detect any corruption of the data in the packet 110. The use of CRC values is well-known and, therefore, need not be further described.

The downstream packet 110 also includes four SND bytes (SND A-SND D), where each SND byte corresponds to an upstream channel associated with the downstream channel on which the downstream packet 110 is being sent. Each SND byte contains a session ID of a sender (i.e., a set top converter box 20) that is allowed to transmit upstream data in the next upstream slot of the corresponding upstream channel. For example, if the SND B byte has a value of '1', then the set top converter box 20 assigned the session ID '1' may transmit in the next upstream slot on the upstream channel that corresponds to 'B'. Preferably, if a particular SND byte has a value of zero, any set top converter box 20 is allowed to transmit in the next corresponding upstream slot, for example, to request a new session.

Each downstream packet 110 also has four acknowledgment (ACK A-ACK D) bytes, where each ACK byte corresponds to an upstream channel associated with the downstream channel on which the downstream packet 110 is being sent. As should be understood, each ACK byte is sent in response to the successful receipt of upstream data on a respective upstream channel in the previous upstream slot. Preferably, each ACK byte includes the session ID of the transmitting set top converter box 20 and a check bit indicating whether the serial number of the upstream packet being acknowledged was an even or an odd number.

Figure 5A:
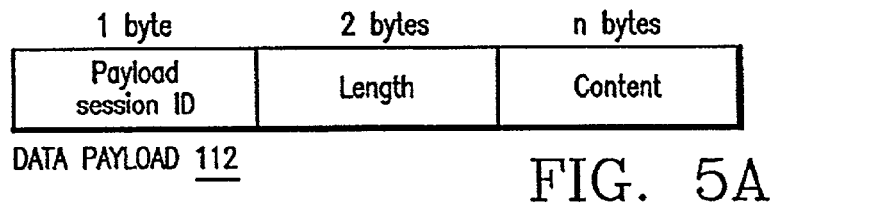
FIGS. 5A and 5B are diagrams of payloads that can be sent in the downstream packet shown in FIG. 4.

Referring now to FIG. 5A, the downstream packet 110 also has a two-byte packet serial number, followed by a multi-byte downstream data payload 112. The downstream data payload 112 includes a one-byte payload session ID for identifying the session ID of the intended receiving set top converter box 20 for the payload, a two-byte length indicator, and the contents of the data being sent in the packet. As should be understood, although all of the set top converter boxes 20 on the downstream channel will receive all downstream packets 110, a particular set top converter box 20 will ignore the contents of the data being sent in the packet 110 unless the data payload 112 has a payload session ID corresponding to the session ID of the set top converter box 20.

Figure 5B:
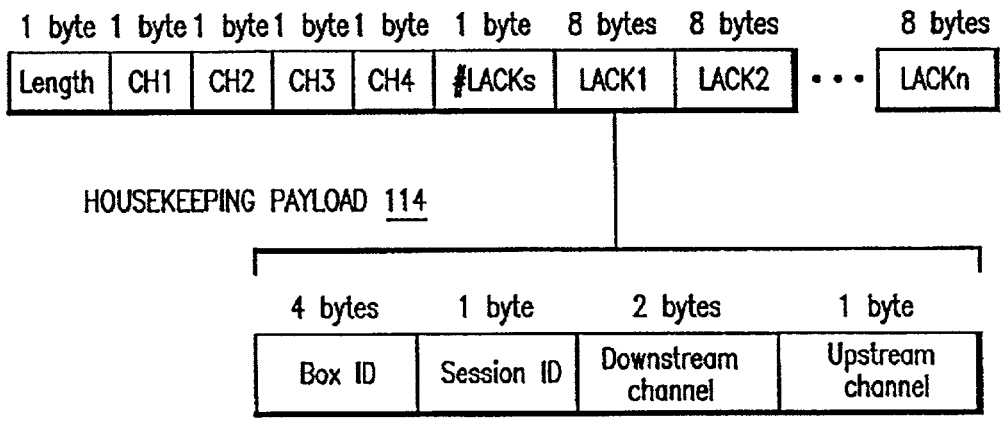

Preferably, a downstream packet 110 periodically has a housekeeping payload 114 rather than a data payload 112, as illustrated in FIG. 5B. As illustrated, the housekeeping payload 114 includes four channel bytes, each channel byte identifying a respective one of the four upstream channels 22 associated with the one of the downstream channels 21 on which the downstream packet 110 is being sent. Accordingly, if a set top converter box 20 wishes to transmit a channel hyperlink request, the set top converter box 20 must listen on the downstream channel for a housekeeping packet 114, and upon receipt of such housekeeping packet can determine what upstream channels are associated with the downstream channel. The set top converter box 20 can then send a hyperlink request on one of the associated upstream channels 22.

If hyperlink requests were recently made and acted upon by the communications controller 70, the housekeeping payload 114 also includes a number of hyperlink request acknowledgments (ACKs). In particular, the housekeeping payload 114 includes a one-byte indicator of the number of ACKS, followed by each ACK. Each ACK includes a 'box ID' corresponding to a unique terminal ID number associated with a requesting set top converter box 20, a one-byte session ID that identifies the requesting set top converter box 20 during the channel hyperlink session, a two-byte downstream channel indicator indicating the one of the downstream channels 21 that the requesting set top converter box 20 should tune in to, and a one-byte upstream channel indicator indicating the upstream channel 22 on which the set top converter box 20 should be broadcasting.

Figure 6:
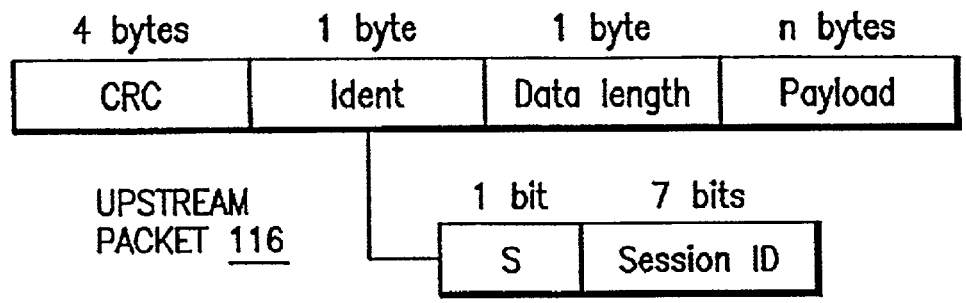
FIG. 6 is a diagram of an upstream packet transmitted on one of the system's upstream channels.
Figure 7A:
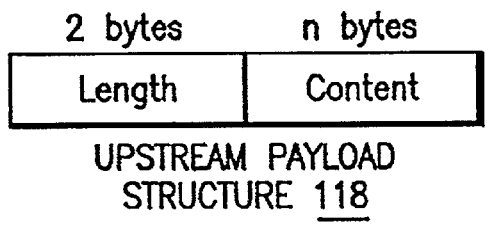
FIGS. 7A–7F are diagrams of payloads that can be sent be sent in the upstream packet shown in FIG. 6.

Referring now to FIG. 6, upstream data from the set top converter box 20 is sent in the form of an upstream packet 116. As illustrated, each upstream packet 116 includes a 4-byte CRC value, as with each downstream packet 110, a one-byte identifier which has the session ID assigned to the set top converter box 20 and a check bit indicating whether the upstream packet 110 has an even or an odd packet number, a one-byte data length indicator indicating the length of a multi-byte upstream payload in the packet 116, and the payload. As illustrated in FIG. 7A, the upstream payload has a structure 118 that includes a two-byte length indicator and the contents of the payload. FIGS. 7B–7F are examples of the contents of various upstream payloads.

Figure 7B:
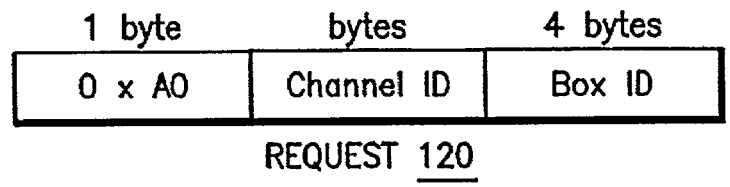

As illustrated in FIG. 7B, a channel hyperlink request 120 from a set top converter box 20 includes a one-byte indicator signifying that the upstream packet 116 is a hyperlink request 120, a two-byte indicator identifying the TV channel that the set top converter box 20 is currently tuned to, and a four-byte indicator identifying the unique box ID of the requesting set top converter box 20. Upon receipt of the channel hyperlink request in 20, the headend server 14 determines the time of the request from a real-time system clock. The time and TV channel number are then used by the headend server 14 to access the hyperlink database 28 to locate the appropriate URL.

Figure 7C:
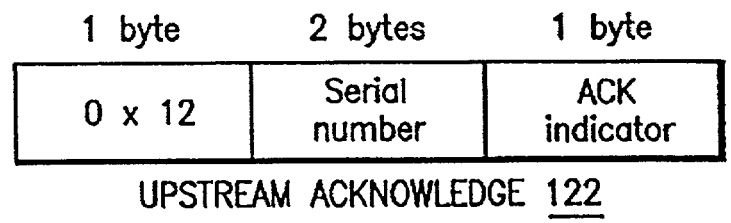

As illustrated in FIG. 7C, an upstream acknowledge payload 122 includes a one-byte indicator signifying that the upstream packet 116 is an upstream acknowledge 122, a two-byte serial number of the downstream packet 110 that is being acknowledged, and a one-byte acknowledge (ACK) indicator.

Figure 7D:
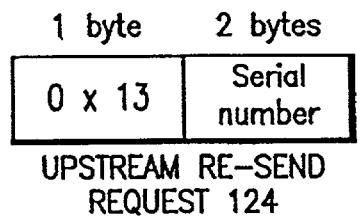

On occasion, an expected downstream data packet 110 is not received, or else is received with a corruption or error. Accordingly, and as illustrated in FIG. 7D, an upstream packet 116 may have an upstream re-send request payload 124 which includes a one-byte indicator signifying that the upstream packet 116 is a re-send request 124, and a two-byte serial number of the downstream packet 110 that must be re-sent.

Figure 7E:
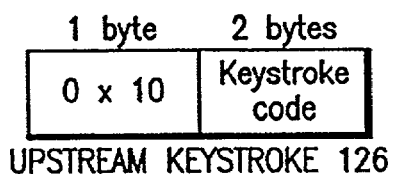

If the data being sent upstream by the set top converter box 20 is a keystroke from a computer-style keyboard or the like, then the upstream packet 116 has an upstream keystroke payload 126, as illustrated in FIG. 7E, which includes a one-byte indicator signifying that the upstream packet 116 is a keystroke payload 126, and a two-byte keystroke code. As should be understood, if the keystroke is from a keyboard, the keystroke code includes information on whether a CTRL/ALT/SHIFT key is being pressed at the time a key is struck.

Figure 7F:
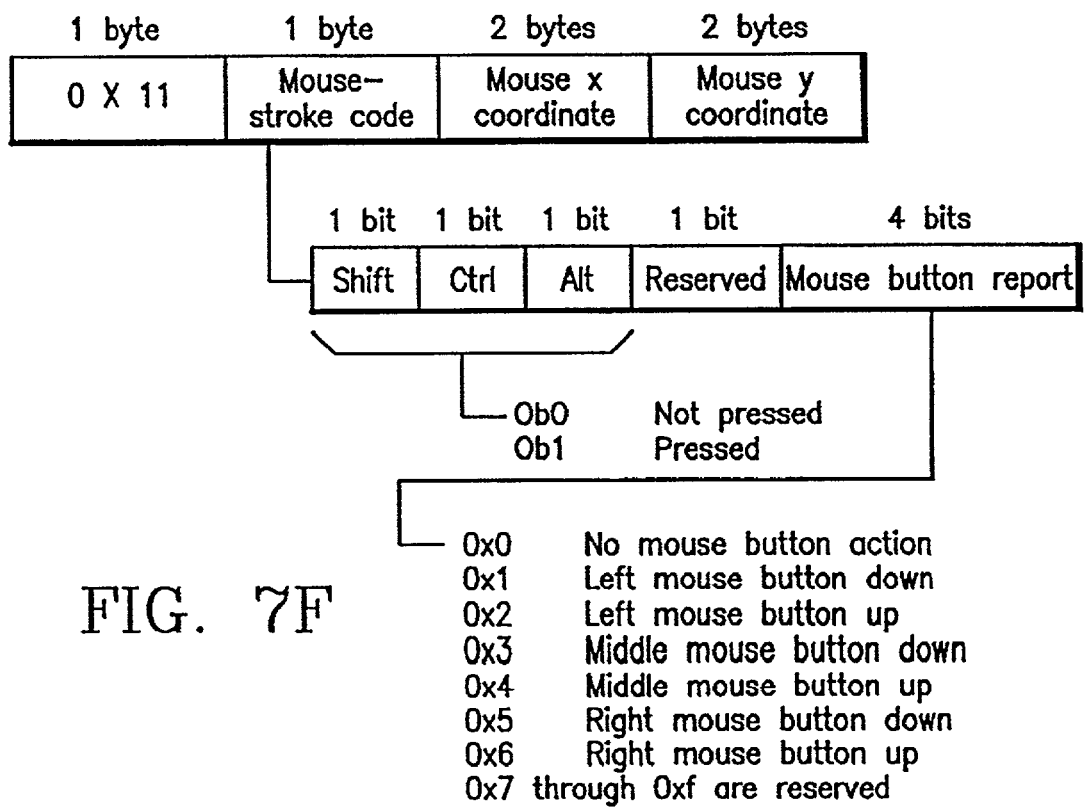

If a mouse or mouse-like device is employed by a user as an input device, mouse movements are input to the set top converter box 20 and the system 10 as commands. Accordingly, an upstream packet 116 may have upstream mouse movement information 128, as illustrated in FIG. 7F. The mouse movement information 128 includes a one-byte indicator signifying that the upstream packet 116 is a mouse movement payload 128, a one-byte mouse-stroke code, a two-byte mouse X-coordinate, and a two-byte mouse Y-coordinate. As should be understood, the one-byte mouse-stroke code includes information on whether a SHIFT/CTRL/ALT key is being pressed, and left, middle and right mouse button information.

As one skilled in the art will readily appreciate, the particular structures of the downstream and upstream packets 110, 116 may be changed without departing from the spirit and scope of the present invention. For example, if only three upstream channels are assigned to a downstream channel, only three SND and three ACK bytes are necessary in the downstream packet 110 (FIG. 4). Similarly, fields in the packets 110, 116 may be added, deleted or changed in terms of structure or size.

As should be understood, due to the structure of a typical television distribution network, noise on upstream channels is problematic. As a result, it is known that upstream channels can have error rates as high as 1:100000 to 1:100. Accordingly, it is preferable that upstream data packets 116 are kept relatively short to lessen the probability that any one packet will be corrupted by noise. It should be noted, however, that such short upstream packets 116 are not prohibitive in that most upstream commands are relatively short: a mouse movement, a keystroke, etc.

With the system 10 as described above, a set top converter box 20 generates a channel hyperlink request in the following manner. Preliminarily, the set top converter box 20 is tuned into one of the downstream channels 21 on which downstream packets 110 are being sent, and listens for a housekeeping packet 114 to determine which upstream channels 22 are associated with the downstream channel 21. A random one of the upstream channels 22 is selected, and a hyperlink request 120 is sent in an upstream slot that has not been preassigned by a respective SND byte. If a hyperlink request acknowledge (ACK) is subsequently received within a pre-determined number of time periods T (corresponding to the length of a picture field and to the length of an upstream slot), the hyperlink request has been successfully received. If not, new random downstream and upstream channels 21 and 22 may be tried.

In the unlikely event that two set top converter boxes 20 send a hyperlink request in the same upstream slot, the communications controller 70 will receive collided data and neither set top converter box 20 will receive an ACK. Preferably, each set top converter box 20 then waits a random amount of time and attempts a second hyperlink request. The process is repeated until both hyperlink requests are handled by the communications controller 70.

Once receipt of the hyperlink session request is acknowledged, the set top converter box 20 waits for a downstream packet 110 that has been addressed to the set top converter box 20 in response to the request. Preferably, each received downstream packet 110 is checked to determine if the packet serial number is correct. If the packet serial number is wrong, a re-send request 124 is sent with the packet serial number of the last packet that was successfully received. Preferably, the headend server 50 interprets a re-send request 124 as a request to re-send the packet 110 having the re-send serial number and every packet 110 sent thereafter.

If a re-send request 124 is sent multiple times without result, or if a downstream packet 110 has not been received by the set top converter box 20 in a predetermined period of time, the set top converter box 20 can attempt a re-connect. Preferably, in a re-connect attempt, the set top converter box 20 makes a hyperlink session request 120 on a new one of the upstream channels 22, and the communications controller 70 responds on a different one of the downstream channels 21.

As discussed above, each downstream packet 110 and upstream packet 116 is quickly acknowledged (ACKed) by the packet recipient, as illustrated in FIGS. 4 and 7C. As should be understood, such quick ACKs are necessary to address the problem of noise and to provide real-time access to the ISP 30. Preferably, a packet sender waits for up to two upstream slots or picture fields to receive an ACK from a packet recipient. If an ACK is not received in this time by a set top converter box 20, the set top converter box 20 preferably re-sends the upstream packet 116 for which acknowledgment is sought. If a set top converter box 20 is forced to re-send data a predetermined number of times, a re-connect attempt is preferably made on new ones of the downstream and upstream channels 21 and 22.

In the operation of the channel hyperlinking system 10, each of the headends 14 preferably pre-caches from the ISP 30, the HTML data pertaining to the channel hyperlinks associated with upcoming programming prior to the broadcasts, and stores this information in the cache 31. As the video programs are received from the satellite 26 and the ID tag data stream is received from the second satellite 43, the headend 14 collects the hyperlink ID tags from the data stream, thereby reducing the hardware costs at the headend 14. At any given instant, the headend 14 can therefore identify the program content of any channel. The headend 14, upon receiving the URL data from the master database 42, can also retrieve the Web information located at the URL address from the ISP 30. As discussed previously, while it is preferable that this procedure be carried out in advance of a video broadcast to facilitate faster processing of hyperlink requests, this process can also be done in real-time if necessary.

If a user viewing a program or advertisement on channel A, for example, wishes to obtain additional information related to the advertised product or television program, the user presses the channel hyperlink button 25 on the keyboard 23 to initiate the request. The terminal processor 96 in the set top converter box 20 receives the request, and forwards it along with the channel and converter box identification information to the headend 14 for processing.

When the headend 14 receives the channel hyperlink information requests from the user, the communications controller 70 sends the channel ID information to the terminal processor 96 which identifies the one of the downstream channels 21 on which the requested channel hyperlink information will be transmitted. In response, the terminal processor 96 instructs the RF tuner 94 to switch to the designated channel. The session manager 72 then connects the user to one of the available active browsers 74, and the headend processor 54 uses the channel and request time information to perform a look up operation in the hyperlink database 28. In this example, the processor 54 accesses the HTML data from the cache 31 which corresponds to the URL information identified by the hyperlink ID tag for channel A at the exact time that the hyperlink request was made. The HTML data is then downloaded by the browser 74 to the user on the selected downstream channel for display on their television 24. If the plural active browsers and pre-caching features of the invention are employed, this entire process from actuation of the hyperlink button 25 to display of the downloaded information on the user television 24 should take only a few seconds by virtue of the fact that the user is quickly connected to an active browser application, and the downloaded Internet-based hyperlink information has already been pre-cached in the cache 31.

Once the user is finished browsing the downloaded information, they either actuate the hyperlink button 25 on the keyboard 23 for closing the Web page, or if they are using a mouse-type input device, they point and click on a back or exit button on the television display screen. In response, the session manager 72 closes the browser application 74 which has been delegated to the user, and the terminal processor 96 switches the tuner 94 back to the previously selected channel so that the user may resume viewing the video broadcast.

Set Top Auto-Leveling System

Terminal Procedure

Figure 8:
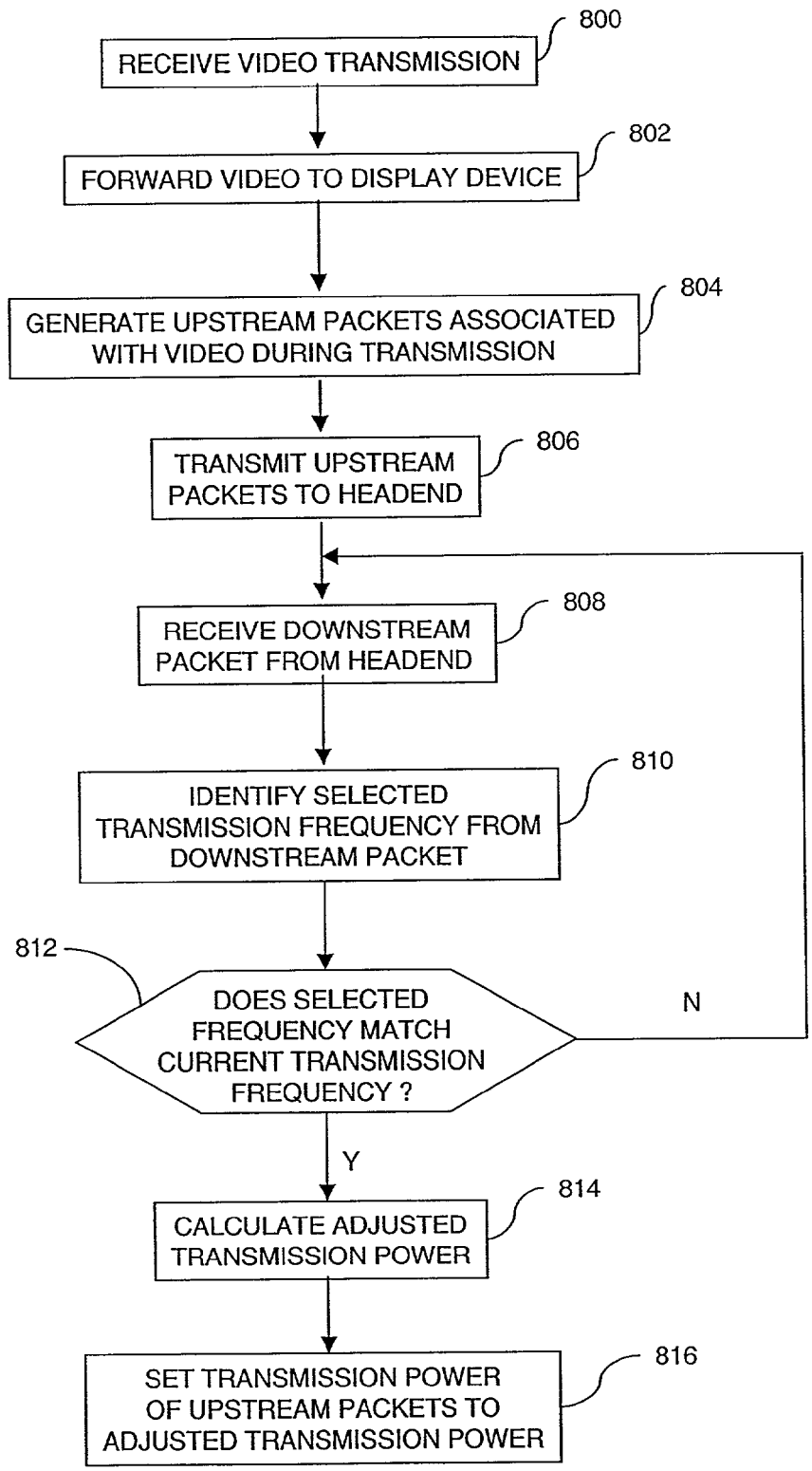
FIG. 8 is a flow chart diagram of an exemplary real-time auto-leveling system according to the present invention, usable in the system of FIGS. 1–7F.
Figure 9:
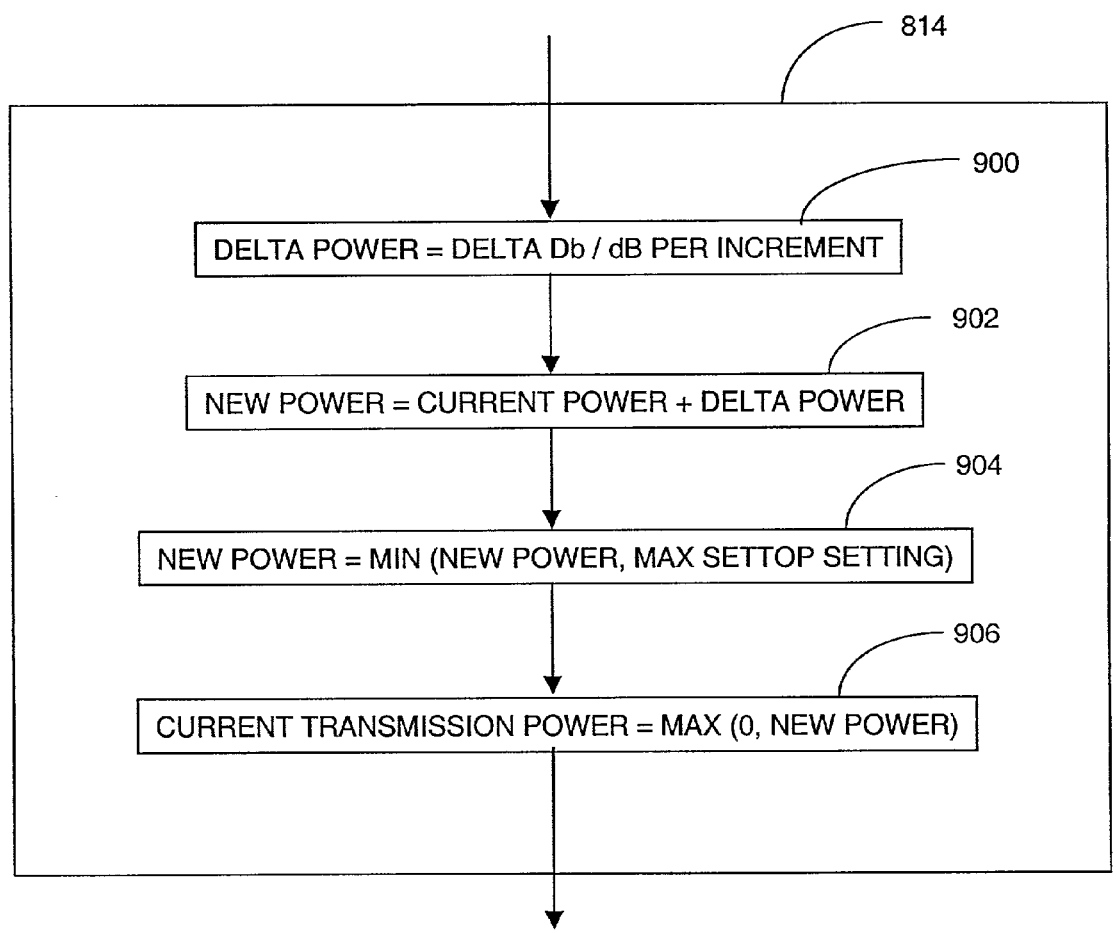
FIG. 9 is s flow chart diagram of a first exemplary method used by a set-top terminal for determining an adjustment to the upstream transmission power of the set-top terminal.
Figure 10:
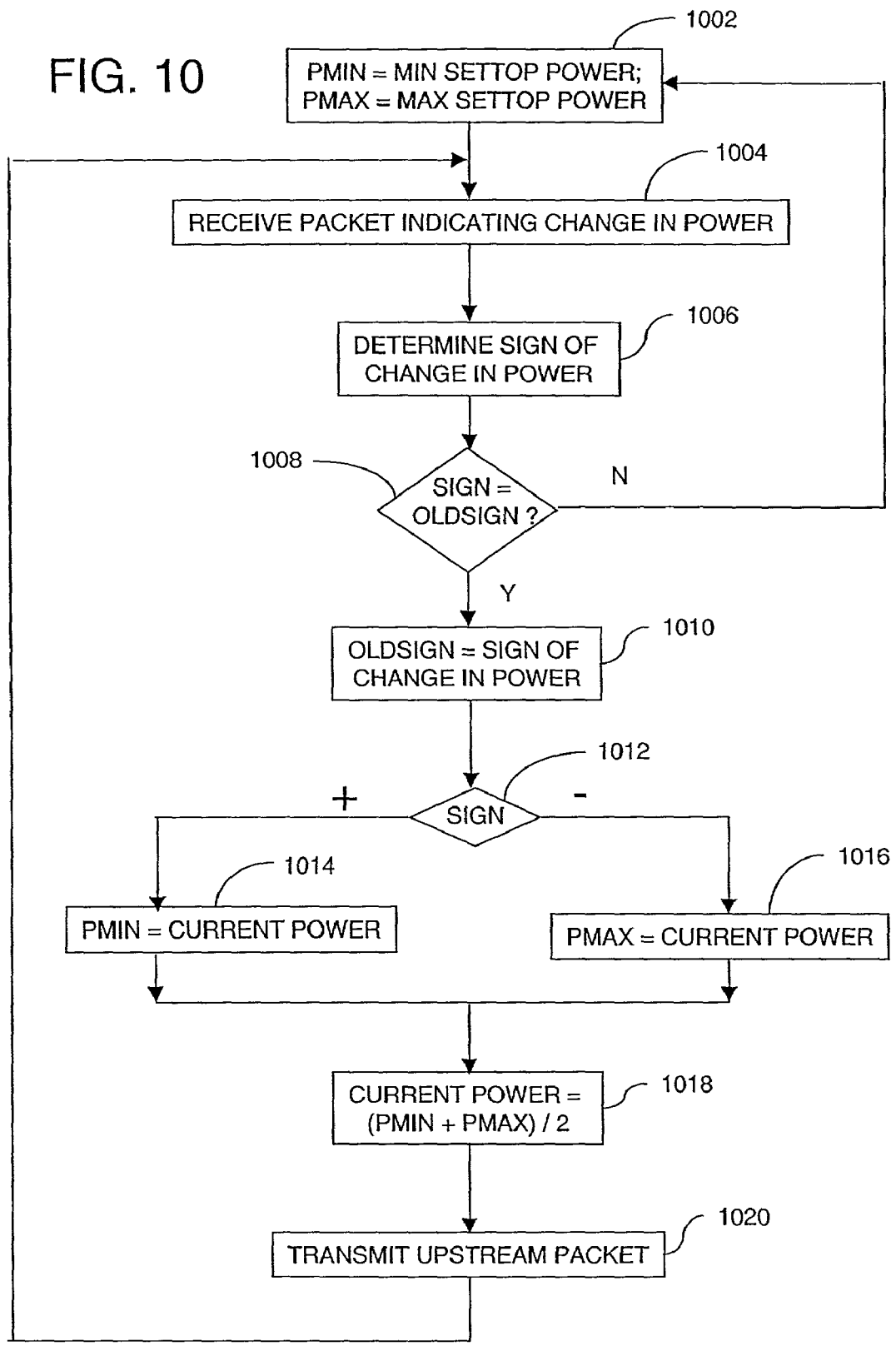
FIG. 10 is s flow chart diagram of a second exemplary method for determining an adjustment to the upstream transmission power of a set-top terminal.
Figure 11:
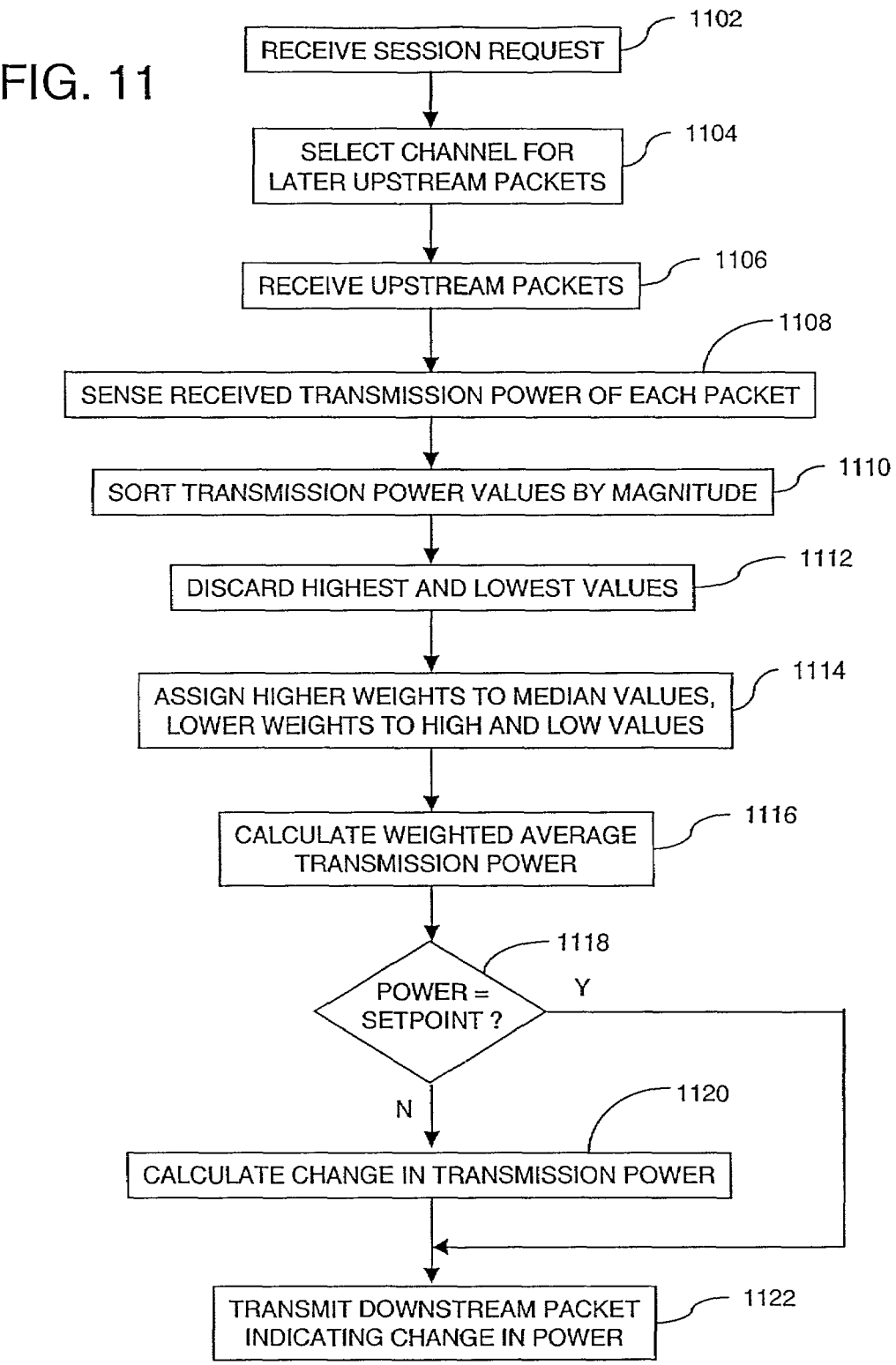
FIG. 11 is a flow chart diagram of an exemplary method used by the network headend for determining a required adjustment in the received upstream power.

FIGS. 8–10 are flow chart diagrams showing the operation of exemplary terminals 20, and FIG. 11 is a flow chart diagram of an exemplary method for operating a network headend 14 coupled to the terminal 20 in a video distribution system 10. Although FIGS. 8–10 describe the interaction between the headend 14 and one terminal, the system may contain any desired number of terminals, all of which interact similarly. As noted above, the terminal 20 may be a set top converter box for a television. The terminal 20 has code that is responsive to auto-leveling commands received from the TOCS headend 14.

At step 800, the terminal 20 receives video transmissions, which may be, for example, a television broadcast.

At step 802, the terminal 20 forwards the video transmissions to a display device, which may be a conventional analog or digital television display or monitor 24.

At step 804, the terminal generates a plurality of upstream packets during the video transmissions. Various possible formats of the upstream packets are described above with reference to FIGS. 6 and 7A–7F. Typically, the upstream packets are the result of an input by a user that is entered into a remote control device or wireless keyboard 23. For example, the user may transmit upstream packets to the headend to request information related to the program currently being displayed. The initial upstream packets request a session. Once a session request is granted, at least some of the subsequently generated upstream packets are associated with the video transmissions.

At step 806, the terminal 20 transmits the plurality of upstream packets to the network headend 14. Each upstream packet has a transmission power and a current transmission frequency. The transmission power of the packet when received at the headend 14 may be attenuated from the transmission power of the packet at its point of origination in the terminal 20. If the power is attenuated, the headend 14 sends the terminal 20 a downstream packet indicating that a change in terminal transmission power is needed.

At step 808, the terminal 20 receives the downstream packet from the network headend 14. The format of the downstream packet is preferably as described above with reference to FIGS. 4, 5A and 5B. The downstream packet indicates a selected upstream transmission frequency and may indicate a change in power if the detected power is below a predetermined limit. The frequency is also sent, so that the terminal 20 can determine whether the control packet is meant for the frequency on which the terminal 20 is currently transmitting. This feature of the communications protocol allows the set top and TOCS headend 14 to tune to a different frequency from the one the terminal 20 sent its login request on.

At step 810, the terminal 20 identifies the selected transmission frequency from the downstream packet.

At step 812, the terminal 20 determines whether the selected transmission frequency matches the current transmission frequency of the terminal 20. If the selected and current transmission frequencies do not match, the control packet is discarded.

At step 814, if the selected transmission frequency matches the current transmission frequency, terminal 20 calculates an adjusted transmission power in the terminal, based on the change in power specified in the downstream packet.

At step 816, the terminal 20 sets the transmission power of the upstream packets to the adjusted transmission power.

FIG. 9 is a detailed flow chart showing a first exemplary method for (step 814) calculating a new terminal transmission power, based on the change in power indicated by the downstream packet.

Steps 900–902 calculate a new transmission power value based on the change in power. Although steps 900 and 902 are based on a linear relationship among the change in power, current power and the new power value, other relationships (e.g., a polynomial relationship) may be used. For example, a polynomial of a desired degree (e.g., a quadratic polynomial) may be used to calculate the relationship among the old power, the change requested by the TOCS headend 14, and the new power.

At step 900, the change in the transmission power in the terminal 20 is calculated by dividing the change in power (in dBmV) requested by the TOCS headend 14 by a constant representing the number of dBmV per watt. The constant (referred to as "dB per increment" in FIG. 9) identifies the number of additional dBmV of power received at the headend 14 when an extra watt of transmission power is added at the terminal. This constant can be estimated empirically.

At step 902, the new terminal transmission power is calculated by adding the result of step 900 to the current transmission power.

At steps 904 and 906, the software in the terminal 20 adjusts the new transmission power value if the new power value lies outside a predetermined allowable range.

At step 904, if the newly calculated power is above the maximum setting of terminal 20, then the newly calculated power is reduced to the maximum power setting.

At step 906, if the newly calculated power is less than zero, then the new power level is set to zero.

FIG. 10 is a flow chart diagram of an alternative method for determining the change in power in the terminal 20. The method of FIG. 10 may be substituted for the procedure shown in FIG. 9. This method is based on a half-interval method, such as that described in Carnahan and Wilkes, *Digital Computing and Numerical Methods*, John Wiley & Sons, Inc., New York, N.Y., pp 267–268, which is incorporated by reference herein.

This method includes: (1) determining first and second boundaries to be used in a search for an adjusted transmission power value (where one of the first and second boundaries is the current value of the transmission power, and the other of the first and second boundaries is either a minimum or a maximum transmission power value) based on the sign of the change in power; (2) setting the transmission power to the midpoint between the first and second boundaries; and (3) repeating steps (1) and (2) until the change in power equals zero or the sign of the change in power changes.

At step 1002, the minimum boundary PMIN and maximum boundary PMAX are initialized to the minimum and maximum transmission power levels of terminal 20, respectively. Preferably, these values are selected so that the set point is approximately at the midpoint between PMIN and PMAX, but this is not an absolute requirement.

At step 1004, the terminal 20 receives a packet from the TOCS headend 14 indicating that a change in power is required.

At step 1006, the terminal 20 checks the sign of the change in power indicated in the downstream packet.

At step 1008, a convergence test is performed by determining whether the sign of the change in power is the same as the most recent previous sign (OLDSIGN) of the change in power transmitted by the headend 14. If the sign is not the same (i.e., either the sign has reversed or the current change of power indicated in the downstream packet is zero), then control passes to step 1002, and the boundary values of PMIN and PMAX are reset to the minimum and maximum set top transmission power values, respectively.

At step 1010, the current sign of the change in power requested by the headend 14 is saved in the variable OLDSIGN. This value is used during the next execution of step 1008 (as described above).

At steps 1012, 1014 and 1016, one of the boundaries of the convergence interval is adjusted. The choice of which boundary to adjust depends on the sign of the change in power indicated in the downstream packet.

At step 1014, if the sign of the requested change in power is positive, then the minimum boundary PMIN of the convergence interval is set to the current transmission power level of the terminal 20. The maximum boundary PMAX of the convergence interval remains unchanged.

At step 1016, if the sign of the requested change in power is negative, then the maximum boundary PMAX of the convergence interval is set to the current transmission power level of the terminal 20. The minimum boundary PMIN of the convergence interval remains unchanged.

At step 1018, the current transmission power level of the terminal 20 is set to the midpoint between PMIN and PMAX.

At step 1020, the terminal 20 transmits an upstream packet using the newly calculated transmission power. At this point control is passed to step 1004.

The main loop of steps 1004–1020 is repeated until the change in power requested by the headend 14 reaches zero or begins to oscillate (i.e., changes sign). Oscillation indicates that the granularity of the TOCS sensors has been reached. When this condition is detected at step 1008, the search bounds PMIN and PMAX are set back to the minimum and maximum power settings of the terminal 20.

Although two specific examples of power adjustment algorithms are described above, the use of other algorithms is contemplated. As noted, the algorithm may be based on a polynomial that relates the new transmission power in the terminal 20 to the change in power requested by the headend 14. Because the goal is to reduce the difference between the set point and the measured received power at the TOCS headend 14 to zero, a variety of conventional root-seeking numerical methods (e.g., Newton's method, Regula-Falsi and the like) may be used.

Headend Procedure

FIG. 11 is a flow chart diagram of an exemplary method for operating a TOCS network headend 14 coupled to at least one terminal 20. On the TOCS headend 14, the level range for each upstream receiver 88 may be specified individually. The control points consist of low, high, and set point levels. These form the low, high and ideal levels at which set top terminals 20 are expected to transmit their messages.

The auto-leveling functions in the TOCS headend 14 include two types of sequences: (1) a sample sequence, which occurs periodically, or when the level of the set top terminal 20 drifts out of its specified control range; and (2) a control sequence consisting of three "sample-then-set" procedures. A "sample-then-set" procedure includes: (a) performing a sampling sequence, (b) calculating a weighted average of the received power level in the headend 14; and (c) transmitting a control packet to the terminal 20 indicating the required change in transmission power to be implemented in the terminal.

To prevent level thrash, the "sample-then-set" procedures are separated from each other by a short period of time (which may be, for example, 10 seconds). Further, in the exemplary embodiment, each sample-then-set procedure generates a control output even if the samples indicate the set top terminal 20 is at the desired level.

At step 1102, the headend 14 receives a session request, such as that described above with reference to FIG. 7B.

At step 1104, the headend 14 selects a channel for use by the terminal 20 in transmitting later upstream packets. This channel may be the channel used to transmit the session request, or it may be a different channel. The protocol described above allows the headend 14 to change the channel being used by the terminal 20 for transmission of upstream packets.

At step 1106, the headend 14 receives a plurality of samples, or upstream packets, from the terminal 20, on the selected channel. Each sample (upstream packet) has an associated power level. Only a small number of samples are required to produce a valid power reading, usually no more than ten.

In the exemplary embodiment, a sample sequence is initiated in the following situations:
On a periodic basis (for example, every 5 minutes).
When a single sample drifts out of the specified range.
At the beginning of each "sample-then-set" event in a control sequence.

At step 1108, the headend 14 senses a received transmission power of each packet. In the exemplary embodiment, the received power level is determined by the RF demodulator 87, which is shown in FIG. 2. The demodulator 87 includes hardware that is able to determine the power level.

At steps 1110–1116, a weighted average transmission power is calculated by the TOCS headend 14. A variety of averaging techniques may be used. The exemplary average is calculated by eliminating stray (non-representative) readings, and applying a heavier weight to values near the median. In this way, missing or invalid readings are filtered out, leaving more representative samples for consideration. (Missing and invalid values occur when the RF demodulator 87 cannot successfully determine the power level of a packet. This may occur in as many as 25% of the packets.)

The weighting array may be modified in order to tailor its filtering characteristics to any bias the receiver may induce in the samples.

At step 1110, the TOCS headend 14 sorts the received transmission powers in order of magnitude. The sorted sample level values are stored in an array from which the weighted average is computed.

At step 1112, the received transmission powers having highest and lowest magnitude are discarded. This is equivalent to applying a weight of zero to the highest and lowest values.

At step 1114, the TOCS headend 14 assigns a higher weight to a median received transmission power than to the highest and lowest ones of the received transmission powers that are not discarded.

In the exemplary embodiment, the weight array is: weight( )={0, 0, 1, 1, 1, 2, 2, 1, 1, 0}. According to this weighting, the median sample is weighted about twice as heavily as other samples. Other weightings may be used. For example, the samples may be assigned weights according to a Gaussian probability distribution function.

At step 1116 the TOCS headend 14 calculates a weighted average transmission power based on the received transmission powers.

The weighted average dBmV is computed (with a typical weighting array):

$$\text{avg} = \left(\sum_{n=0}^{m} \text{weight}(n) * \text{sample}(n)\right) \div \left(\sum_{n=0}^{m} \text{weight}(n)\right)$$

where m=number of samples

At step 1118, the calculated average power is compared to a predetermined control range. The control range is a small range of tolerance around the set point, providing hysteresis to the system. Any value within the control range is treated as though the received power is the same as the set point value, and no adjustment is required. If the received power is below the lower value of the control range or above the upper value of the control range, then the headend 14 initiates an adjustment in transmission power.

An alternative test that could be performed at step 1118 simply compares the calculated average power to the set point, and initiates an adjustment in transmission power whenever the average power does not equal the set point. This alternative results in more frequent adjustments, but may result in less deviation from the set point.

Step 1120 is performed if received power is outside the control range at step 1118. At step 1120, the headend 14 calculates a change in transmission power based on the weighted average and a predetermined set point power. In the exemplary embodiment, this is achieved by subtracting the weighted average received power from the set point power. Step 1120 can be skipped if the received power is within the control range at step 1118.

At step 1122, the headend 14 performs a control sequence by generating and transmitting a downstream packet (a control output packet) to the terminal 20. The downstream packet indicates the change in power calculated at step 1120. This is a signed value, so that the set top terminal 20 may adjust the transmission power up or down relative to its current setting. If there is no change in power, the control output packet can indicate zero change in power. In an alternative embodiment, step 1122 can be skipped if the received power equals the set point at step 1118.

In the exemplary embodiment, the downstream (control output) packet further indicates a selected transmission frequency on which upstream packets are to be transmitted by the terminal. The set top terminal 20 examines the frequency to determine whether the control packet is intended for that terminal 20 or another terminal. The terminal 20 generally only responds to control packets which indicate the same transmission frequency on which the terminal is transmitting. As noted above, this allows the upstream transmission channel to be changed at any time after the initial session request.

Other Variations

In the exemplary embodiment, a control sequence includes three ten-sample sequences. This may result in a higher than desired deviation in transmission power when the terminal 20 first issues its session login request (for example, within about two seconds of the login request). A variation of the exemplary embodiment provides for a first adjustment very quickly after the login request, to prevent the transmission power from drifting along at an unacceptable level for too long. In this variation, instead of using three ten-packet sequences to determine the first three control packets, the first three single-packet valid received dB readings (taken while not waiting for a leveling command to be acknowledged) are used. Thus, receipt of the login packet by the headend 14 would usually trigger the first leveling command packet sent to the terminal 20, so communications are improved from the beginning of the session.

The exemplary embodiment initiates transmission power adjustments every five minutes, or whenever the received power lies outside the control range. In another alternative embodiment, samples are continuously collected and adjustments may be made at any time. For example, headend 14 may: determine whether the three (or other predetermined number of) most recent received power readings at any moment in time are approximately equal to each other but deviate significantly from the set point, and, if so, issuing a control packet. This process can be performed continually while upstream packets are received from the terminal. In another variation of the foregoing continually-applied level control technique, if the set top terminal 20 is incapable of reaching the desired transmission power level within a predetermined period of time (or number of iterations), then a problem is reported as a problem for field service. The report may take the form of an automatically generated message, such as an electronic mail message.

Another variation of the exemplary system may be used to provide plant diagnostic capability. This variation includes the use of an informational packet sent to the TOCS headend 14 that indicates the absolute transmission power setting that the set top terminal 20 is using to transmit. When the set top type and the measured (received) packet power level are taken into account by the headend 14, this power setting can be used to determine the attenuation of the signal. Abnormal attenuation can be indicative of cable problems in the customer's installation, or of a gross level problem in a node.

Although the invention has been described in terms of exemplary embodiments, it is not limited thereto. Rather, the appended claim should be construed broadly, to include other variants and embodiments of the invention, which may be made by those skilled in the art without departing from the scope and range of equivalents of the invention.

What is claimed is:

1. In a video distribution system, a method for operating a terminal coupled to a network headend, the method comprising:
   (a) transmitting a plurality of upstream packets to the network headend, each upstream packet having a transmission power;
   (b) receiving a downstream packet from the network headend, the downstream packet indicating a change in power;
   (c) calculating an adjusted transmission power in the terminal, based on the change in power specified in the downstream packet; and
   (d) setting the transmission power of the upstream packets to the adjusted transmission power, wherein step (c) includes:
   calculating a new transmission power value based on the change in power; and
   adjusting the new transmission power value if the new power value lies outside a predetermined allowable range.

2. The method of claim 1, wherein the calculating is performed based on a linear function relating the transmission power to the new power value, based on the change in power.

3. A terminal capable of being coupled to a network headend in a video distribution system, comprising:
   means for transmitting a plurality of upstream packets to the network headend, each upstream packet having a transmission power;
   means for receiving a downstream packet from the network headend, the downstream packet indicating a change in power;
   means for calculating an adjusted transmission power, based on the change in power specified in the downstream packet; and
   means for setting the transmission power of the upstream packets to the adjusted transmission power, wherein the calculating means includes:
   means for calculating a new power value based on the change in power;
   means for adjusting the new power value if the new power value lies outside a predetermined allowable range; and
   means for setting the adjusted transmission power equal to the adjusted new power value.

4. The terminal of claim 3, wherein the calculating means uses a linear function to relate the transmission power and the new power value, based on the change in power.

5. The terminal of claim 3, wherein the adjusting means include:
   means for checking the sign of the change in power indicated in the downstream packet;
   means for determining first and second boundaries to be used in a search for an adjusted transmission power value, one of the first and second boundaries being the current value of the transmission power, the other of the first and second boundaries being selected from the group consisting of the minimum or the maximum transmit power value based on the sign of the change in power; and
   means for setting the transmission power to the midpoint between the first and second boundaries.

6. In a video distribution system, a method for operating a terminal coupled to a network headend, the method comprising:
   (a) transmitting a plurality of upstream packets to the network headend, each upstream packet having a transmission power;
   (b) receiving a downstream packet from the network headend, the downstream packet indicating a change in power;
   (c) calculating an adjusted transmission power in the terminal, based on the change in power specified in the downstream packet; and
   (d) setting the transmission power of the upstream packets to the adjusted transmission power, wherein:
   the plurality of upstream packets have a current transmission frequency;
   the downstream packets specify a selected transmission frequency;
   the method further comprises the step of determining whether the selected transmission frequency matches the current transmission frequency; and
   steps (c) and (d) are performed only when the selected transmission frequency matches the current transmission frequency.

7. The method of claim 6, further comprising, before step (a):
   (1) receiving video transmissions;
   (2) forwarding the video transmissions to a display device;
   (3) generating at least some of the plurality of upstream packets during the video transmissions, so that at least some of the upstream packets are associated with the video transmissions.

8. The method of claim 7, wherein the upstream packets associated with the video transmissions are requests for information related to the information content of the video transmissions.

9. The method of claim 7, wherein steps (a) through (d) are performed by a television set top converter box.

10. A terminal capable of being coupled to a network headend in a video distribution system, comprising:
    means for transmitting a plurality of upstream packets to the network headend, each upstream packet having a transmission power;
    means for receiving a downstream packet from the network headend, the downstream packet indicating a change in power;
    means for calculating an adjusted transmission power, based on the change in power specified in the downstream packet; and
    means for setting the transmission power of the upstream packets to the adjusted transmission power, wherein:
    the plurality of upstream packets have a current transmission frequency;
    the downstream packets specify a selected transmission frequency;
    the terminal further comprises means for determining whether the selected transmission frequency matches the current transmission frequency; and
    the power setting means only sets the transmission power when the selected transmission frequency matches the current transmission frequency.

11. The terminal of claim 10, further comprising:
    a receiver that receives video transmissions; and
    means for forwarding the video transmissions to a display device;
    means for generating at least some of the plurality of upstream packets during the video transmissions, so that at least some of the upstream packets are associated with the video transmissions.

12. The terminal of claim 11, wherein the upstream packets associated with the video transmissions are requests for information related to the information content of the video signals.

13. The terminal of claim 12, wherein the terminal is a television set top converter box.

14. The terminal of claim 10, wherein the adjusting means include:
   means for checking the sign of the change in power indicated in the downstream packet;
   means for determining first and second boundaries to be used in a search for an adjusted transmission power value, one of the first and second boundaries being the current value of the transmission power, the other of the first and second boundaries being selected from the group consisting of the minimum or the maximum transmit power value based on the sign of the change in power; and
   means for setting the transmission power to the midpoint between the first and second boundaries.

15. In a video distribution system, a method for operating a network headend coupled to at least one terminal, the method comprising:
   (a) receiving a plurality of upstream packets from the terminal;
   (b) sensing a received transmission power of each packet;
   (c) calculating a weighted average transmission power based on the received transmission powers;
   (d) calculating a change in transmission power based on the weighted average and a predetermined set point power; and
   (e) transmitting a downstream packet to the terminal, the downstream packet indicating the change in power;
      wherein step (c) includes assigning a higher weight to a median received transmission power than to a highest one and a lowest one of the received transmission powers that are not discarded.

16. The method of claim 15, wherein the downstream packet further indicates a selected transmission frequency on which upstream packets are to be transmitted by the terminal.

17. The method of claim 16, further comprising, before performing steps (a) through (e), the step of receiving a session request from the terminal, the session request having a different frequency from the selected transmission frequency.

18. The method of claim 15, wherein steps (a) through (e) are performed when one of the upstream packets has a received transmission power that is outside of a predetermined range.

19. The method of claim 15, wherein steps (a) through (e) are performed continually while upstream packets are received from the terminal.

20. In a video distribution system, a network headend capable of being coupled to at least one terminal, comprising:
   means for receiving a plurality of upstream packets from the terminal;
   means for sensing a received transmission power of each packet;
   means for calculating a weighted average transmission power based on the received transmission powers;
   means for calculating a change in transmission power based on the weighted average and a predetermined set point power; and
   means for transmitting a downstream packet to the terminal, the downstream packet indicating the change in power;
   wherein the calculating means include:
   means for assigning a higher weight to a median received transmission power than to a highest one and a lowest one of the received transmission powers that are not discarded.

21. The network headend of claim 20, wherein the downstream packet further indicates a selected transmission frequency on which upstream packets are to be transmitted by the terminal.

22. The network headend of claim 21, further comprising means for receiving a session request from the terminal, the session request having a different frequency from the selected transmission frequency.

23. The network headend of claim 20, wherein the transmitting means transmits a downstream packet indicating the change in power when one of the upstream packets has a received transmission power that is outside of a predetermined range.

24. The network headend of claim 20, wherein the calculating means include:
   means for sorting the received transmission powers by magnitude; and
   means for discarding received transmission powers having highest and lowest magnitude.

25. In a video distribution system, a method for operating a terminal coupled to a network headend, the method comprising:
   (a) transmitting a plurality of upstream packets to the network headend, each upstream packet having a transmission power;
   (b) receiving a downstream packet from the network headend, the downstream packet indicating a change in power;
   (c) calculating an adjusted transmission power in the terminal, based on the change in power specified in the downstream packet; and
   (d) setting the transmission power of the upstream packets to the adjusted transmission power, wherein step (a) includes:
      (1) checking the sign of the change in power indicated in the downstream packet;
      (2) determining first and second boundaries to be used in a search for an adjusted transmission power value, one of the first and second boundaries being the current value of the transmission power, the other of the first and second boundaries being selected from the group consisting of a minimum and a maximum transmit power value based on the sign of the change in power; and
      (3) setting the transmission power to the midpoint between the first and second boundaries.

26. The method of claim 25, wherein steps (1), (2) and (3) are repeated until the change in power equals zero or the sign of the change in power changes.

27. In a video distribution system, a method for operating a network headend coupled to at least one terminal, the method comprising:
   (a) receiving a plurality of upstream packets from the terminal;
   (b) sensing a received transmission power of each packet;
   (c) calculating a weighted average transmission power based on the received transmission powers;

(d) calculating a change in transmission power based on the weighted average and a predetermined set point power; and
(e) transmitting a downstream packet to the terminal, the downstream packet indicating the change in power; wherein step (c) includes:
(1) sorting the received transmission powers by magnitude;
(2) discarding received transmission powers having highest and lowest magnitude; and
(3) assigning a higher weight to a median received transmission power than to the highest and lowest ones of the received transmission powers that are not discarded.

28. The method of claim 27, wherein steps (a) through (e) are performed continually while upstream packets are received from the terminal.

29. A computer readable medium encoded with computer program code for operating a programmable terminal that is coupled to a network headend of a video distribution system, such that when the program code is executed by the terminal, the terminal executes the steps of:
(a) transmitting a plurality of upstream packets to the network headend, each upstream packet having a transmission power;
(b) receiving a downstream packet from the network headend, the downstream packet indicating a change in power;
(c) calculating an adjusted transmission power in the terminal, based on the change in power specified in the downstream packet; and
(d) setting the transmission power of the upstream packets to the adjusted transmission power;

wherein:
the plurality of upstream packets have a current transmission frequency;
the downstream packets specify a selected transmission frequency;
the method further comprises the step of determining whether the selected transmission frequency matches the current transmission frequency; and
steps (c) and (d) are performed only when the selected transmission frequency matches the current transmission frequency.

30. A computer readable medium encoded with computer program code for operating a network headend of a video distribution system that is coupled to a terminal, such that when the program code is executed by the network headend, the terminal executes the steps of:
(a) receiving a plurality of upstream packets from the terminal;
(b) sensing a received transmission power of each packet;
(c) calculating a weighted average transmission power based on the received transmission powers;
(d) calculating a change in transmission power based on the weighted average and a predetermined set point power; and
(e) transmitting a downstream packet to the terminal, the downstream packet indicating the change in power; wherein step (c) includes:
assigning a higher weight to a median received transmission power than to a highest one and a lowest one of the received transmission powers that are not discarded.

* * * * *

UNITED STATES PATENT AND TRADEMARK OFFICE
CERTIFICATE OF CORRECTION

| | | |
|---|---|---|
| PATENT NO. | : 7,032,238 B2 | Page 1 of 1 |
| APPLICATION NO. | : 09/908134 | |
| DATED | : April 18, 2006 | |
| INVENTOR(S) | : James Winton Parnell et al. | |

It is certified that error appears in the above-identified patent and that said Letters Patent is hereby corrected as shown below:

In the drawings, sheet 2 of 10, in box "16," delete "DIST" and insert --DiST.--
In column 22, line 42, delete "(a)" and insert instead --(c)--

Signed and Sealed this

Fifth Day of September, 2006

JON W. DUDAS
*Director of the United States Patent and Trademark Office*

UNITED STATES PATENT AND TRADEMARK OFFICE
CERTIFICATE OF CORRECTION

PATENT NO.        : 7,032,238 B2
APPLICATION NO.   : 09/908134
DATED             : April 18, 2006
INVENTOR(S)       : James Winton Parnell et al.

It is certified that error appears in the above-identified patent and that said Letters Patent is hereby corrected as shown below:

In the drawings, sheet 2 of 10, in box "16," delete "DIST" and insert --DIST.--
In column 22, line 42, delete "(a)" and insert instead --(c)--

This certificate supersedes Certificate of Correction issued September 5, 2006.

Signed and Sealed this

Third Day of April, 2007

JON W. DUDAS
*Director of the United States Patent and Trademark Office*